US012671653B2

(12) United States Patent
Yu et al.

(10) Patent No.: US 12,671,653 B2
(45) Date of Patent: Jun. 30, 2026

(54) SYSTEM AND METHOD FOR MANAGING A UART MULTIPLEXER CONNECTED TO MULTIPLE HOSTS

(71) Applicant: Quanta Computer Inc., Taoyuan City (TW)

(72) Inventors: Chun-Ching Yu, Taoyuan City (TW); Ching-Chuan Liu, Taoyuan City (TW); Hsi-Han Lin, Taoyuan City (TW); Shuen-Hung Wang, Taoyuan City (TW)

(73) Assignee: Quanta Computer Inc., Taoyuan City (TW)

( * ) Notice: Subject to any disclaimer, the term of this patent is extended or adjusted under 35 U.S.C. 154(b) by 563 days.

(21) Appl. No.: 18/302,150

(22) Filed: Apr. 18, 2023

(65) Prior Publication Data

US 2024/0356842 A1 Oct. 24, 2024

(51) Int. Cl.
*H04L 12/66* (2006.01)
*H04L 45/00* (2022.01)

(52) U.S. Cl.
CPC ................................... *H04L 45/70* (2013.01)

(58) Field of Classification Search
CPC . H04L 1/0071; H04L 1/0041; H04L 27/3411; H04L 5/0048; H04L 1/0045; H04L 27/2647; G06F 13/4282; G06F 13/4022; G06F 9/4405; G06F 1/26; G06F 1/3203; G06F 13/4221; G06F 9/5077; G06F 13/1652; G06F 11/3006; G06F 13/382
See application file for complete search history.

(56) References Cited

U.S. PATENT DOCUMENTS

| | | | | | |
|---|---|---|---|---|---|
| 5,524,185 | A | * | 6/1996 | Na | G06F 3/1279 358/1.15 |
| 7,421,612 | B1 | * | 9/2008 | Maranhao | H04L 45/00 714/4.11 |
| 8,598,908 | B1 | * | 12/2013 | Sullam | G06F 13/385 365/189.08 |
| 2003/0118055 | A1 | * | 6/2003 | Fecher | H04W 88/02 370/352 |
| 2008/0201501 | A1 | * | 8/2008 | Partani | H04L 41/04 710/63 |
| 2012/0124312 | A1 | * | 5/2012 | Vemuri | G06F 3/067 711/E12.001 |
| 2017/0177529 | A1 | * | 6/2017 | Staudenmaier | G06F 13/385 |
| 2017/0329737 | A1 | * | 11/2017 | Barot | G06F 13/362 |
| 2024/0211427 | A1 | * | 6/2024 | Cudak | G06F 13/4221 |

* cited by examiner

*Primary Examiner* — Kharye Pope
(74) *Attorney, Agent, or Firm* — Nixon Peabody LLP

(57) ABSTRACT

A computing system including two or more controllers, a universal asynchronous receiver-transmitter (UART) multiplexer, and a combinational logic circuit is provided. The two of more controllers include a first controller and a second controller. The first controller is configured to provide a first status signal and a first select control signal, and the second controller is configured to provide a second status signal and a second select control signal. The UART multiplexer is configured to provide UART output from at least a first UART input and a second UART input based on a UART select signal. The combinational logic circuit is configured to determine the UART select signal is one of the first select control signal or the second select control signal based at least in part on the first status signal and the second status signal.

20 Claims, 5 Drawing Sheets

| Receive a plurality of status signals generated by two or more controllers | ~502 |

| Receive a plurality of select control signals generated by the two or more controllers | ~504 |

| Select one of the plurality of select control signals as a UART select signal | ~506 |

| Provide UART outputs based at least in part on the UART select signal | ~508 |

SYSTEM AND METHOD FOR MANAGING A UART MULTIPLEXER CONNECTED TO MULTIPLE HOSTS

FIELD OF THE INVENTION

The present invention relates generally to management of computing systems, and more specifically to managing control of universal asynchronous receiver-transmitter (UART) multiplexers that serve multiple hosts.

BACKGROUND OF THE INVENTION

Computing systems (e.g., servers, desktop computers, laptop computers, etc.) are used in different contexts for a wide range of functions. Some computing systems operate on batteries and may require low-power operation to conserve charge on the batteries. On the other hand, some computing systems may be plugged into a power outlet, and low-power operation is not as important as computing performance. Many computing systems balance performance and power consumption, even when plugged into a power outlet. Components within computing systems typically use signaling to coordinate steps performed to complete one or more tasks assigned to the computing systems. When signaling fails, computing systems that do not employ redundancies can exhibit errors or fail to complete assigned tasks. The present disclosure provides systems and methods for addressing component failures or delays when managing communication protocols.

SUMMARY OF THE INVENTION

The term embodiment and like terms, e.g., implementation, configuration, aspect, example, and option, are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings, and each claim.

According to certain aspects of the present disclosure, a computing system is provided. The computing system includes two or more controllers, a universal asynchronous receiver-transmitter (UART) multiplexer, and a combinational logic circuit is provided. The two of more controllers include a first controller and a second controller. The first controller is configured to provide a first status signal and a first select control signal, and the second controller is configured to provide a second status signal and a second select control signal. The UART multiplexer is configured to provide UART output from at least a first UART input and a second UART input based on a UART select signal. The combinational logic circuit is configured to determine the UART select signal is one of the first select control signal or the second select control signal based at least in part on the first status signal and the second status signal.

In an implementation, the combinational logic circuit is further configured to determine that the UART select signal is the first select control signal based at least in part on the first status signal indicating that the first controller is available. In an implementation, the combinational logic circuit is further configured to determine that the UART select signal is the second select control signal based at least in part on the first status signal indicating that the first controller is unavailable and the second status signal indicating that the second controller is available. In an implementation, the combinational logic circuit is further configured to determine a change in state of the first controller from unavailable to available. The combinational logic is further configured to determine that the UART select signal is the first select control signal.

In an implementation, the two or more controllers include one or more baseband management controllers (BMCs), one or more storage controllers, one or more bridge integrated circuits, or any combination thereof. In an implementation, the first controller is a controller on a first server node and the second controller is a controller on a second server node. In an implementation, the first controller is a first BMC, and the second controller is a second BMC. In an implementation, the first BMC is provided on a first DC-SCM and the second BMC is provided on a second DC-SCM. In an implementation, the combinational logic circuit is further configured to determine the UART select signal as one of a plurality of control signals including at least the first select control signal and the second select control signal, and wherein the UART select signal is determined based at least in part on one of a plurality of control signals including the first status signal and the second status signal. In an implementation, a third controller of the two or more controllers is a first storage controller on the first server node, the UART select signal determined based on the first status signal, the second status signal, and a third status signal provided by the third controller. In an implementation, the combinational logic circuit is configured to determine that the two or more controllers are organized in a priority, in which, the first controller is of a higher priority than the second controller.

According to certain aspects of the present disclosure, a computer-implemented method is provided. The computer-implemented method includes receiving, by a combinational logic circuit, a plurality of status signals generated by two or more controllers. Each controller generates a corresponding status signal. The method further includes receiving, by the combinational logic circuit, a plurality of select control signals generated by the two or more controllers. Each controller generates a corresponding select control signal. The method further includes determining, by the combinational logic circuit, that one of the plurality of the select control signals is a UART select signal for controlling a UART multiplexer based at least in part on the plurality of status signals. The method further includes providing, by the UART multiplexer, UART outputs based at least in part on the UART select signal.

In an implementation, the method further comprises determining the UART select signal as a first select control signal based at least in part on a first status signal indicating that a first controller of the two or more controllers is available. In an implementation, the method further comprises determining the UART select signal as a second select control signal based at least in part on (i) a second status signal of the plurality of status signals indicating that a second controller of the two or more controllers is available and (ii) a first status signal of the plurality of status signals indicating that a first controller of the two or more controllers is unavailable. In an implementation, the method further includes determining, by the combinational logic circuit, that the first status signal indicates a change in status of the first controller from unavailable to available. The method further includes determining, by the combinational logic circuit, that the UART select signal is the first select control signal.

In an implementation, the two or more controllers include one or more baseband management controllers (BMCs), one or more storage controllers, one or more bridge integrated circuits, or any combination thereof. In an implementation, a first controller of the two or more controllers is located on a first server node and a second controller of the two or more controllers is located on a second server node.

According to certain aspects of the present disclosure, multi-node server is provided. The multi-node server includes a plurality of server nodes including a first server node and a second server node. The first server node includes a universal asynchronous receiver-transmitter (UART) multiplexer and a first plurality of controllers. Each of the first plurality of controllers is configured to generate a corresponding status signal. The second server node includes a second plurality of controllers. Each of the second plurality of controllers is configured to generate a corresponding status signal. The multi-node server further includes a combinational logic circuit configured to determine a UART select signal for managing the UART multiplexer based at least in part on (i) one or more status signals generated by the first plurality of controllers, (ii) one or more status signals generated by the second plurality of controllers, or (iii) both (i) and (ii). The UART multiplexer is configured to provide UART output based at least in part on the determined UART select signal.

In an implementation, the combinational logic circuit is further configured to determine the UART select signal based at least in part on assigned priority between controllers of the first plurality of controllers, the second plurality of controllers, or both. In an implementation, the first server node further includes a first baseband management controller (BMC) and the second server node further includes a second BMC. The first BMC has a higher assigned priority than the second BMC, and the combinational logic circuit is further configured to determine that the UART select signal is (i) a select control signal generated by the first BMC when a status of the first BMC is available, (ii) a select control signal generated by the second BMC when the status of the first BMC is unavailable and a status of the second BMC is available.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The disclosure, and its advantages and drawings, will be better understood from the following description of representative embodiments together with reference to the accompanying drawings. These drawings depict only representative embodiments, and are therefore not to be considered as limitations on the scope of the various embodiments or claims.

DETAILED DESCRIPTION

Figure 1:
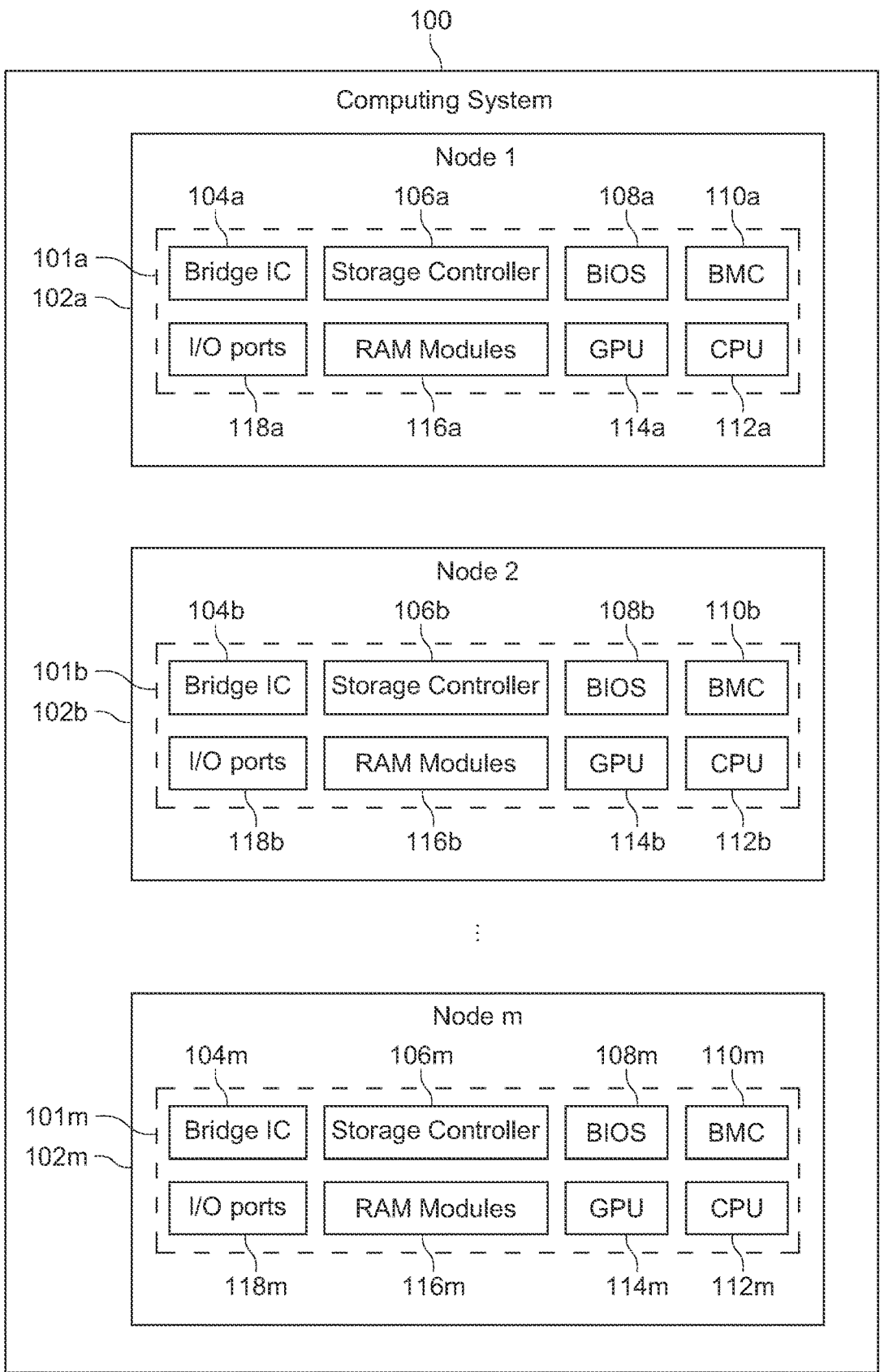
FIG. 1 is a block diagram of a first computing system, according to certain aspects of the present disclosure.

A computing system can be a single node or can include multiple nodes. A computing system that includes multiple nodes is a multi-node computing system. A node is a computing system with at least one processor and a memory. A multi-node computing system provides a single universal asynchronous receiver-transmitter (UART) port, even though the multi-node computing system contains multiple components that utilize UART protocol and generate UART information. Thus, a UART multiplexer is provided to allow selecting UART information from different components. Usually, the UART multiplexer selection is only controlled from a baseband management controller (BMC). If the BMC fails or if the BMC is busy, then the UART multiplexer selection process will not work, thus disrupting signaling which may be important to executing tasks performed by the multi-node computing system. A similar problem can occur for single node computing systems having a plurality of controllers. For example, the UART multiplexer is controlled from a BMC of the single node system, and if the BMC fails or if the BMC is busy, then the UART multiplexer selection process will not work. Therefore, a solution to the unavailability of the BMC can ensure proper functioning of a UART port in both single node and multi-node computing systems.

Thus, embodiments of the present disclosure provide systems and methods for allowing multiple controllers to control the same UART multiplexer in a computing system. Status signals are provided by the different controllers capable of managing the same UART multiplexer. The multiple controllers can be organized based on a priority order, so that if a first controller designated for managing the UART multiplexer is not available, then a second controller can take over the task of managing the UART multiplexer until the first controller becomes available.

Various embodiments are described with reference to the attached figures, where like reference numerals are used throughout the figures to designate similar or equivalent elements. The figures are not necessarily drawn to scale and are provided merely to illustrate aspects and features of the present disclosure. Numerous specific details, relationships, and methods are set forth to provide a full understanding of certain aspects and features of the present disclosure, although one having ordinary skill in the relevant art will recognize that these aspects and features can be practiced without one or more of the specific details, with other relationships, or with other methods. In some instances, well-known structures or operations are not shown in detail for illustrative purposes. The various embodiments disclosed herein are not necessarily limited by the illustrated ordering of acts or events, as some acts may occur in different orders and/or concurrently with other acts or events. Furthermore, not all illustrated acts or events are necessarily required to implement certain aspects and features of the present disclosure.

For purposes of the present detailed description, unless specifically disclaimed, and where appropriate, the singular includes the plural and vice versa. The word "including" means "including without limitation." Moreover, words of approximation, such as "about," "almost," "substantially," "approximately," and the like, can be used herein to mean "at," "near," "nearly at," "within 3-5% of," "within acceptable manufacturing tolerances of," or any logical combination thereof. Similarly, terms "vertical" or "horizontal" are intended to additionally include "within 3-5% of" a vertical or horizontal orientation, respectively. Additionally, words of direction, such as "top," "bottom," "left," "right," "above," and "below" are intended to relate to the equivalent direction as depicted in a reference illustration; as understood contextually from the object(s) or element(s) being referenced, such as from a commonly used position for the object(s) or element(s); or as otherwise described herein.

Referring to FIG. 1, a block diagram of a computing system 100 is provided. The computing system 100 can be a single node computing system or a multi-node computing system. That is, the computing system 100 includes one or more nodes (e.g., node 1 102a, node 2 102b, . . . node m 102m). In some implementations, the computing system 100 is a single node server containing only node 1 102a.

In some implementations, the computing system 100 is a multi-node server, and each of the one or more nodes (i.e., node 1 102a, node 2 102b, . . . node m) can be independent server nodes. A multi-node server is a computer server that includes two or more independent server nodes that share a single enclosure and one or more power supplies. Power is distributed to all nodes in the multi-node server through the shared power supplies. A power distribution board (PDB) can be provided in the computing system 100, and all the nodes (e.g., node 1 102a, node 2 102b, . . . node m 102m) connect to the PDB through a board-to-board connector interface. One or more series bus signals (e.g., I2C, GPIOs) can be used for communication between nodes. Furthermore, UART can be provided for low-speed communication.

In some implementations, the computing system 100 is a multi-node system where all of the nodes are identical to each other. In some implementations, one or more of the nodes (e.g., node 1 102a) contains different types of components from another one or more of the nodes (e.g., node 2 102b). In an example, node 1 102a includes a server board 101a. The server board 101a can be a printed circuit board (PCB) that serves as a communications backbone for all components and external peripherals that connect to the node 1 102a. In some examples, the server board 101a is a motherboard that includes copper connecting traces and copper planes for power and signal isolation. The motherboard can include a processor (e.g., a graphics processing unit (GPU) 114a, a central processing unit (CPU) 112a, etc.), memory (e.g., random access memory (RAM) modules 116a, basic input/output system (BIOS) 108a), one or more controllers (e.g., a BMC 110, a bridge integrated circuit (IC) 104a, a storage controller 106a, etc.), and/or one or more input/output (I/O) ports 118a.

Although indicated as singular in FIG. 1, the CPU 112a (and/or GPU 114a) can be one or more processors (e.g., one processor, two processors, three processors, etc.). In some implementations, the GPU 114a is separated from the CPU 112a and communicate with the CPU 112a via the one or more I/O ports 118a on the server board 101a. For example, the I/O ports 118a can include peripheral component interconnect express (PCIe) slots for receiving the GPU 114a, and the CPU 112a can manage initialization and operation of the GPU 114a via the PCIe bus standard. The GPU 114a is coupled to video interfaces that allow monitors or screens to connect to the server board 101a.

The RAM modules 116a can include dual inline memory modules (DIMMs) of double data rate synchronous dynamic random-access memory (DDR SDRAM). The RAM modules 116a are high speed volatile memory modules that serve as main memory for the CPU 112a. The main memory for the CPU 112a is used when cache memory or register memory of the CPU 112a does not include information that the CPU 112a needs. The RAM modules 106 are higher capacity memory when compared to the cache memory or register memory of the CPU 112a. The BIOS 108a can be provided to facilitate booting operations for the node 1 102a.

The BMC 110a is a specialized controller (or processor) for managing operations of the node 1 102a. In some implementations, the BMC 110a enables remote monitoring of the node 1 102a, having communication channels to different components of the node 1 102a. For example, the BMC 110a can allow remote monitoring of fan speeds, temperature sensors, hard drive faults, power supply failures, operating system faults, etc. The BMC 110a can include internal temporary cache memory that facilitates the BMC 110a processing of machine-readable instructions. Example BMCs include ASPEED AST2300, AST2400, AST2500, AST2600, etc.

The one or more I/O ports 118a can include serial AT attachment (SATA) ports to connect bus adapters to storage devices such as hard disk drives, solid state drives, optical drives, etc. The I/O ports 118a can include more PCI or PCIe ports for receiving cards such as Ethernet cards, Wi-Fi cards, Bluetooth cards, sound cards, etc. The I/O ports 118a can include universal serial bus (USB) ports to connect peripheral devices or mass storage devices. The I/O ports 118a can support communication via inter-integrated circuit (I2C) protocol, UART protocol, and/or serial peripheral interface (SPI) protocol.

The bridge IC 104a can provide protocol conversions to allow compatibility between devices and/or components connected to the node 1 102a. For example, the bridge IC 104a can be an interface between the CPU 112a and another component of the node 1 102a (e.g., a peripheral device like a modem, mouse, etc.). The CPU 112a can communicate using SPI or I2C and the peripheral device can communicate using UART. The bridge IC 104a provides conversion services between SPI or I2C and UART to facilitate communication between the CPU 112a and the peripheral device. The bridge IC 104a is a simple controller for board management that can provide GPIO, sensor, I2C interface etc. Example bridge ICs include ASPEED AST1030 and AST1035.

The storage controller 106a can control storage arrays. The storage controller 106a determines which device from multiple storage devices (e.g., hard disks, solid state drives, etc.) to write to or to read from. The storage controller 106a can provide several services, for example, storage or volume management, redundant array of independent disks (RAID), provide snapshots or states of storage devices, automatically tier storage devices to achieve certain service level agreements, etc. SAS can be provided for high-speed communication between storage controllers (e.g., between storage controller 106a and storage controller 106b). The storage controller 106a may include a SAS/SATA controller, an SAS expander, and/or a PCIe switch controller for PCIe nonvolatile memory express (NVMe) solid state drive (SSD), E1.S SSD, etc. Examples of the storage controller 106a include Broadcom SAS/SATA storage I/O controllers SAS4016, SAS3816, SAS3408, etc.

The node 2 102b through the node m 102m can include similar components as the node 1 102a. That is, the node 2 102b can include a bridge IC 104b, and the node m 102m can include a bridge IC 104m, both of which are similar to (or the same as) the bridge IC 104a. The node 2 102b can include a server board 101b, and the node m 102m can include a server board 101m. The node 2 102b can include a storage controller 106b, and the node m 102m can include a storage controller 106m, both of which are similar to (or the same as) the storage controller 106a. The node 2 102b can include a BIOS 108b, and the node m 102m can include a BIOS 108m, both of which are similar to (or the same as) the BIOS 108a. The node 2 102b can include a BMC 110b, and the node m 102m can include a BMC 110m, both of which are similar to (or the same as) the BMC 110a. The node 2 102b can include a CPU 112b, and the node m 102m can include a CPU 112m, both of which are similar to (or the same as) the CPU 112a. The node 2 102b can include a GPU 114b, and the node m 102m can include a GPU 114m, both of which are similar to (or the same as) the GPU 114a. The node 2 102b can include RAM modules 116b, and the node m 102m can include a RAM modules 116m, both of which are similar to (or the same as) the RAM modules 116a. The node 2 102b can include I/O ports 118b, and the node m 102m can include a I/O ports 118m, both of which are similar to (or the same as) the I/O ports 118a.

In some implementations, two or more nodes can share components. For example, the BMC 110a can be shared between node 1 102a and node 2 102b so that node 2 102b does not have its own BMC (i.e., the BMC 110b is not provided). In some implementations, the BMC 110a is provided on a separate circuit board called a backboard. The backboard can provide access to components that are shared between the different nodes 1 102a through nodes m 102m.

Figure 2:
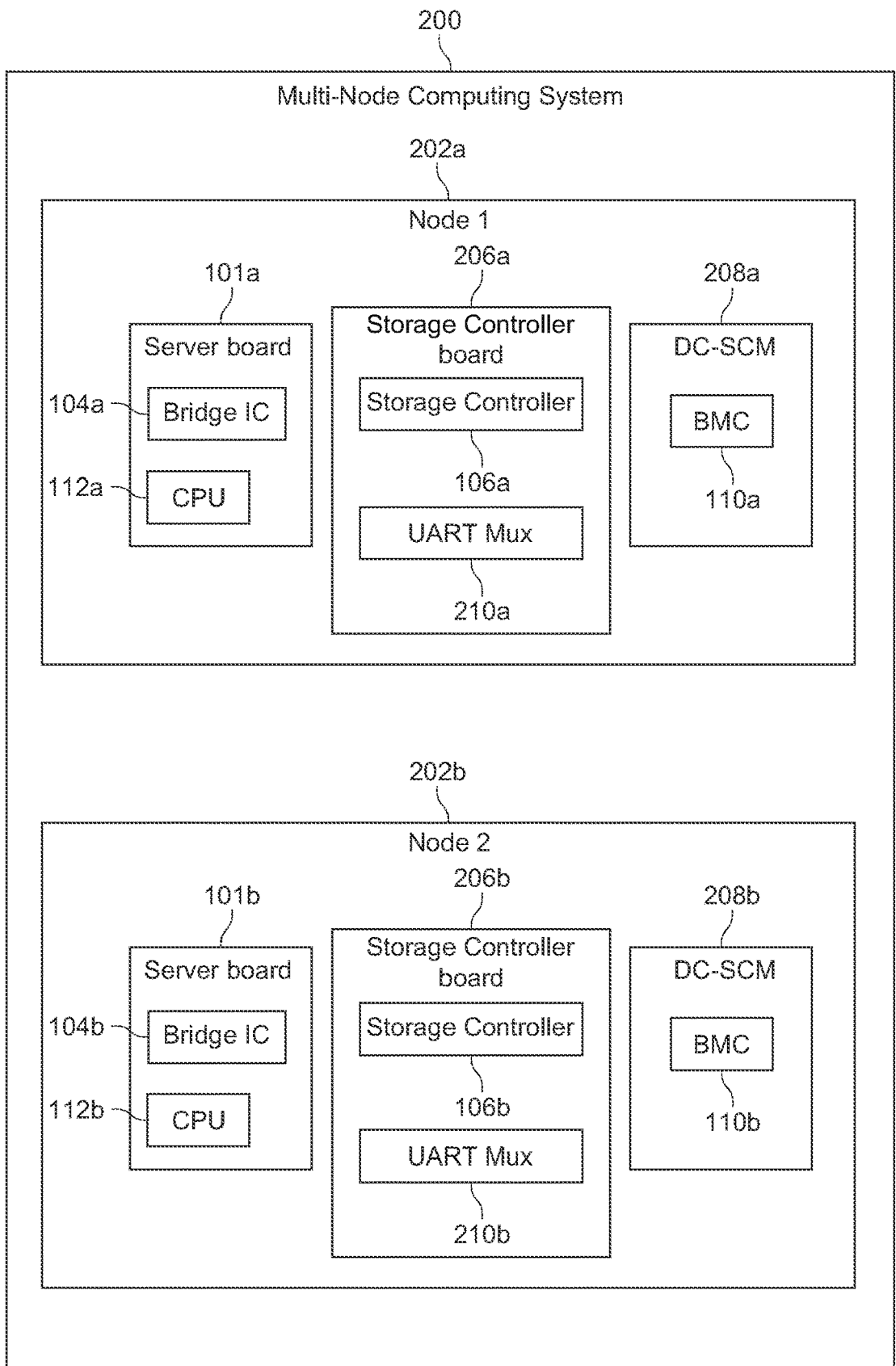
FIG. 2 is a block diagram of a multi-node computing system, according to certain aspects of the present disclosure.

Referring to FIG. 2, a block diagram of a multi-node computing system 200 is provided, according to certain aspects of the present disclosure. The multi-node computing system 200 is merely provided as an example, for as previously discussed, embodiments of the present disclosure may apply to a single node computing system with a plurality of controllers and/or a multi-node computing system. The multi-node computing system 200 is the same as or similar to the computing system 100. The multi-node computing system 200 is simplified to show two nodes (i.e., node 1 202a and node 2 202b). Other nodes may be added to the multi-node computing system 200 to expand the number of nodes; or one of node 1 202a or node 2 202b can be removed to convert the multi-node computing system 200 to a single node computing system.

The node 1 202a and the node 2 202b are arranged such that different components are provided on different circuit boards. For example, the bridge IC 104a and the bridge IC 104b are provided on the server board 101a and the server board 101b, respectively, as in FIG. 1. The storage controller 106 and the storage controller 106b are provided on a storage controller board 206a and a storage controller board 206b, respectively. The BMC 110a and the BMC 110b are provided on a datacenter-ready secure control module (DC-SCM) 208a and DC-SCM 208b, respectively. The storage controller board 206a and the DC-SCM 208a can be received at I/O ports or interfaces assigned to the node 1 202a. Similarly, the storage controller board 206b and the DC-SCM 208b can be received at I/O ports or interfaces assigned to the node 2 202b. In some implementations, the BMC 110a and/or the BMC 110b are provided on the server board 101a and/or the server board 101b, respectively, and not on the DC-SCM 208a and/or the DC-SCM 208b, respectively.

In some implementations, the storage controller board 206a includes a UART multiplexer 210a. In some implementations, the storage controller board 206b includes a UART multiplexer 210b, similar to the UART multiplexer 210a. In some implementations, both UART multiplexer 210a and 210b are provided in the multi-node computing system 200. The following discussion describes the UART multiplexer 210a, but similar configurations can be provided for the UART multiplexer 210b. The UART multiplexer 210a can receive signals from one or more controllers (e.g., the bridge IC 104a, the storage controller 106a, the BMC 110a, the BMC 110b, etc.). A single controller from the one or more controllers is selected as the controller for managing the UART multiplexer 210a. The single controller selects which component's UART information should be provided as output at the UART port of the multi-node computing system 200. Output from the UART multiplexers 210a, 210b can be routed to the front panel of the multi-node computing system 200 in the situations where the nodes of the multi-node computing system 200 share the same front panel. A front panel multiplexer can be provided to choose between outputs from the UART multiplexers 210a and 210b. In situations where the multi-node computing system 200 have independent front panels, the output from the UART multiplexer 210a can be provided to the front panel corresponding to node 1 202a, and the output from the UART multiplexer 210b can be provided to the front panel corresponding to node 2 202b, and so on.

Figure 3:
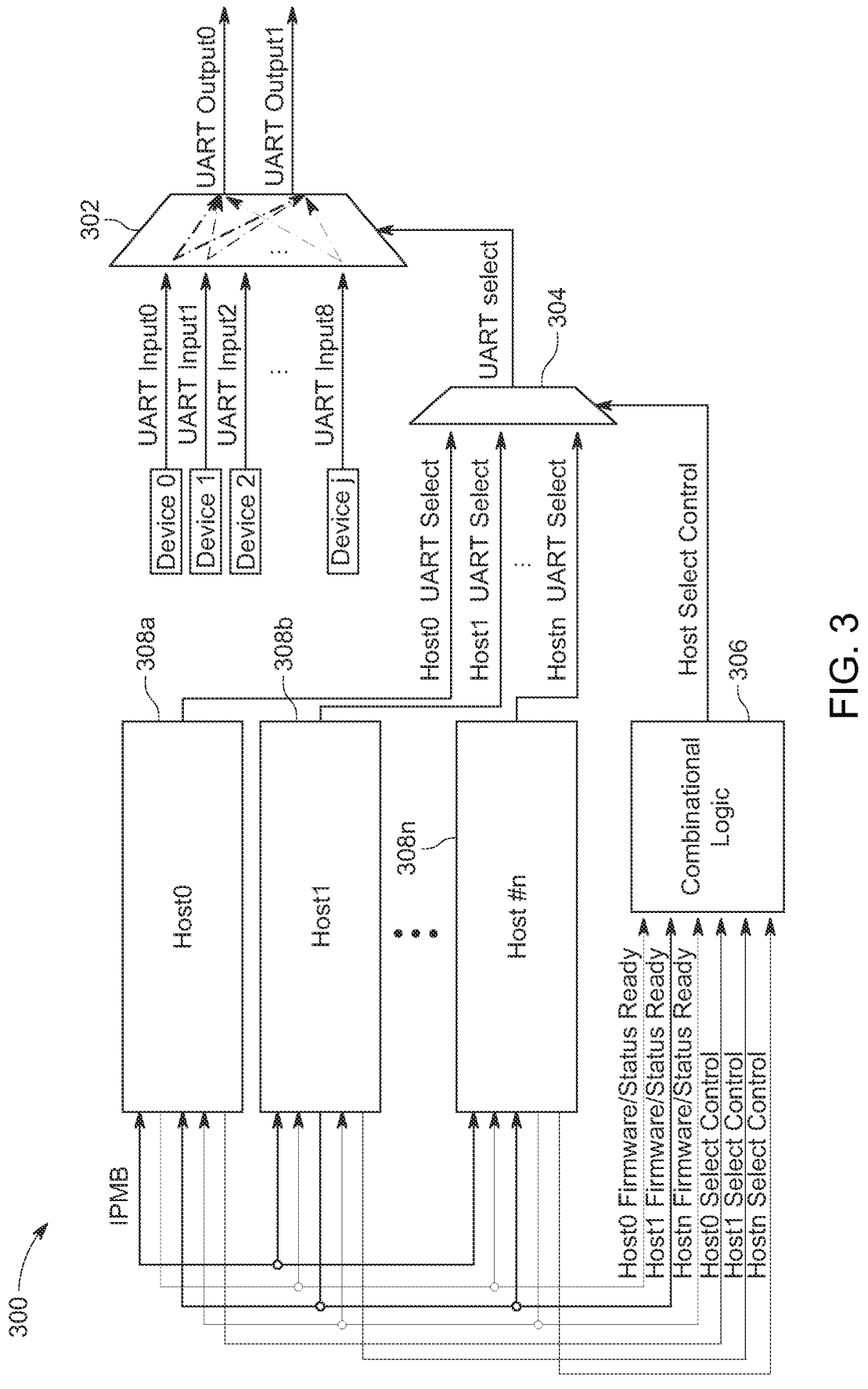
FIG. 3 is a block diagram of a control system for managing UART multiplexers, according to certain aspects of the present disclosure.

Referring to FIG. 3, a block diagram of a control system 300 for managing a UART multiplexer 302 is provided, according to certain aspects of the present disclosure. The UART multiplexer 302 is the same as (or similar to) the UART multiplexer 210a (FIG. 2) or the UART multiplexer 210b (FIG. 2). The control system 300 includes one or more hosts 308a, 308b, . . . 308n. The one or more hosts 308a, 308b, . . . 308n are one or more controllers of a multi-node computing system (e.g., the multi-node computing system 200 of FIG. 2). In one example, the one or more hosts 308a, 308b, . . . 308n are the bridge IC 104a, the storage controller 106a, and the BMC 110a, and the UART multiplexer 302 is the UART multiplexer 210a. That is, the one or more hosts 308a, 308b, . . . 308n can be located on a single node. In a second example, the one or more hosts 308a, 308b, . . . 308n are the bridge IC 104a, the storage controller 106a, the BMC 110a, and the BMC 110b, and the UART multiplexer 302 is the UART multiplexer 210a. That is, the one or more hosts 308a, 308b, . . . 308n can be located across multiple nodes. Furthermore, not all controllers in a system need to be accounted for or provided as candidates for managing the UART multiplexer 210a. The controllers provided as candidates for managing the UART multiplexer 210a can differ from the controllers provided as candidate for managing the UART multiplexer 210b.

In some implementations, the one or more hosts 308a, 308b, . . . 308n can communicate with each other using an intelligent platform management bus (IPMB) communications protocol. The one or more hosts 308a, 308b, . . . 308n can communicate status signals (e.g., $Host_x$ Firmware/Status Ready signals) via IPMB. In some implementations, the status signals are communicated through any proprietary protocol via I2C or via GPIO/SGPIO that connects between the one or more hosts 308a, 308b, . . . 308n. A $Host_x$ Firmware/Status Ready signal indicates whether a specific host (i.e., one of the hosts 308a, 308b, . . . 308n corresponding to Host #x) is available or not available. x is an integer greater than or equal to zero and less than or equal to n. For example, a $Host_x$ Firmware/Status Ready signal from the host 308a can be asserted HIGH (i.e., set to "1") when the host 308a is available and can be unasserted LOW (i.e., set to "0") when the host 308a is not available. A host is not available when the host is (i) busy handling a task and is unable to spare resources for another task, or (ii) experiencing an error or failure that prevents proper operation of the host. In some implementations, a failure includes a hardware component failure, and/or a software-related failure. For example, part of a controller can become defective, rendering the controller unable to properly assert its $Host_x$ Firmware/Status Ready signal. In another example, software relied upon by the controller can include a bug that renders the controller unable to properly assert its $Host_x$ Firmware/Status Ready signal. Each of the $Host_x$ Firmware/Status Ready signals is also provided to a combinational logic circuit 306.

The combinational logic circuit 306 can be provided on one of the storage controller boards 206a, 206b of FIG. 2. In some implementations, the combinational logic circuit 306 is provided on the storage controller board 206a (FIG. 2). In some implementations, the combinational logic circuit 306 is provided on the storage controller board 206b (FIG. 2). The combinational logic circuit 306 can be implemented by a complex programmable logic device (CPLD) provided on one of the storage controller boards 206a, 206b. The combinational logic circuit 306 can define which host of the one or more hosts 308a, 308b, . . . 308n is the primary host and which host of the one or more hosts 308a, 308b, . . . 308n is an alternative host to control the UART multiplexer 302. The combinational logic circuit 306 implements a priority mux structure, and in some implementations, a user of the multi-node computing system 200 (FIG. 2) can determine or program the order of priority.

In some implementations, the one or more hosts 308a, 308b, . . . 308n can communicate select control signals (e.g., $Host_x$ Select Control signals) to the combinational logic circuit 306. The $Host_x$ Select Control signals are used to control a multiplexer 304. At a certain time, only one of these signals is used for controlling the multiplexer 304, and the combinational logic circuit 306 decides which one of these $Host_x$ Select Control signals will be used for control. For example, if the host 308a is selected for controlling the multiplexer 304, then $Host_0$ Select Control signal will be selected for controlling the multiplexer 304.

In some implementations, the combinational logic circuit 306 uses information in the $Host_x$ Firmware/Status Ready signals and the $Host_x$ Select Control signals provided by the one or more hosts 308a, 308b, . . . 308n to determine which of the one or more hosts 308a, 308b, . . . 308n should manage the UART multiplexer 302. In some implementations, the combinational logic circuit 306 generates a Host Select Control signal to control the multiplexer 304 that selects between multiple $Host_x$ UART Select signals. The Host Select Control signal determines which $Host_x$ UART Select signal from the one or more hosts 308a, 308b, . . . 308n should be used in controlling the UART multiplexer

10

302. The multiplexer 304 allows one of the $Host_x$ UART Select signals to control the UART multiplexer 302. The $Host_x$ UART Select signal that ends up controlling the UART multiplexer 302 is indicated in FIG. 3 as UART Select.

In some implementations, the UART Select is an N-bit signal for selecting between $UART Input_y$ signals from j devices. j is an integer greater than or equal to 0 and less than $2^N$, and y is an integer greater than or equal to 0 and less than or equal to j. In FIG. 3, the j devices are provided as Device 0, Device 1, . . . . Device j. Examples of the devices include BIOS, BIC (e.g., AST1030 chip), BMC (e.g., AST2600 chip), storage devices (e.g., BRCM SAS 4x49 chip), etc. The UART multiplexer 302 allows one of the $UART Input_j$ signals to be provided as a UART Output0 signal and UART Output1 signal. In some implementations, a single device can have two or more UART outputs.

In some implementations, in a multi-node server, the combinational logic 306 and the multiplexer 304 can be provided on a common system board (e.g., a power distribution board, a backplane board, etc.). The UART Select can be provided to the different UART multiplexers 210a, 210b, etc.

Although FIG. 3 is described in context of a multi-mode server, the control system 300 can be part of a single node server. For example, the one or more hosts 308a, 308b, . . . 308n all reside on node 1 102a (FIG. 1) of the computing system 100 (FIG. 1). The control system 300 can determine which of the one or more hosts 308a, 308b, . . . 308n controls the UART multiplexer 302.

Figure 4:
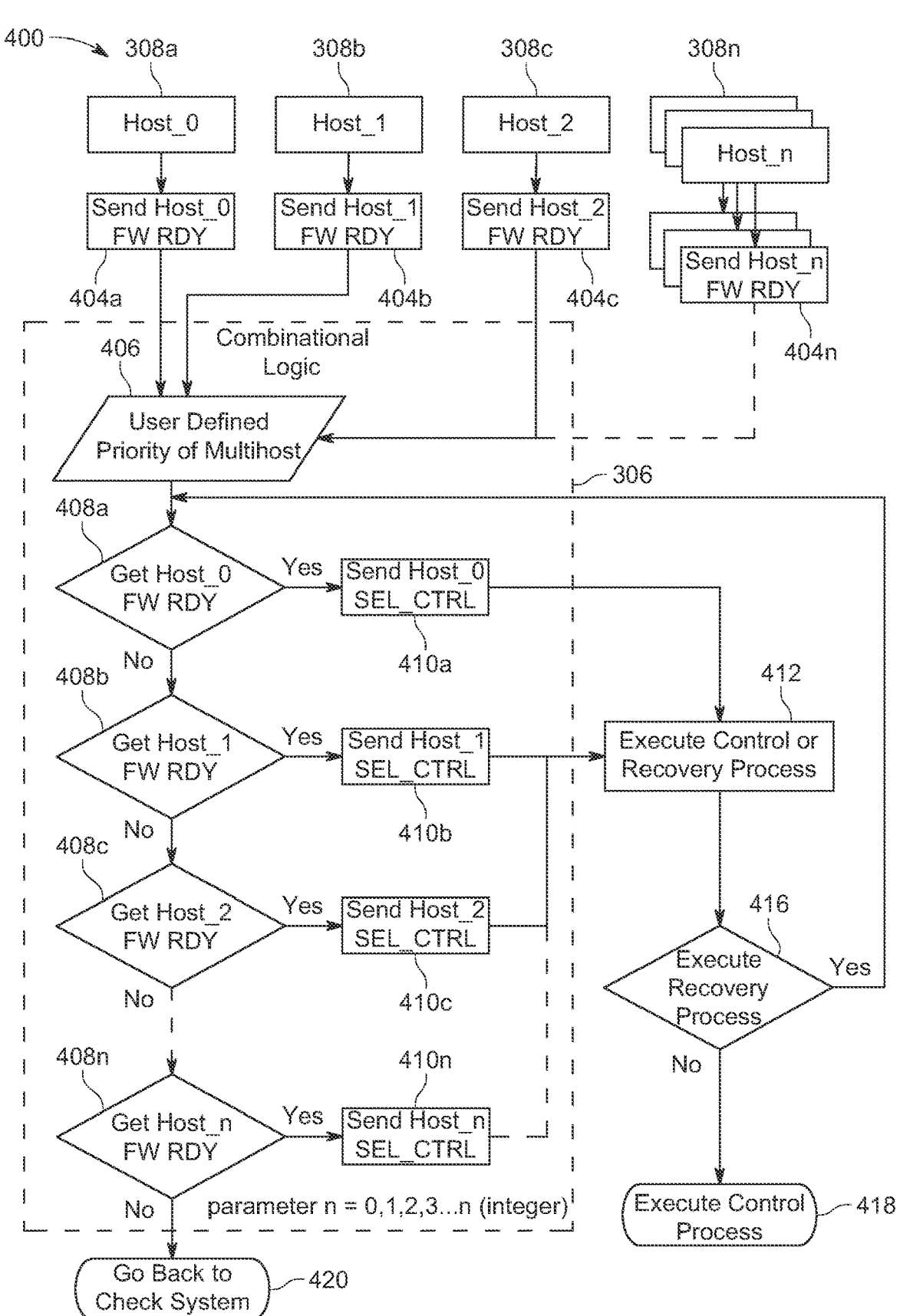
FIG. 4 is a flow diagram illustrating a process for managing a UART multiplexer, according to certain aspects of the present disclosure.

Referring to FIG. 4, a flow diagram illustrating a process 400 for managing a UART multiplexer (e.g., the UART multiplexer 302 of FIG. 3) is provided, according to certain aspects of the present disclosure. The one or more hosts 308a, 308b, 308c, . . . 308n provide $Host_x$ Firmware/Status Ready signals 404a, 404b, 404c, . . . 404n, respectively, to the combinational logic circuit 306. The $Host_x$ Firmware/Status Ready signals 404a, 404b, 404c, . . . 404n are sorted by priority based on defined-priority settings 406. For example, the defined-priority settings 406 can indicate that the host 308a takes priority over all the other hosts 308b through 308n for controlling the UART multiplexer 302 (FIG. 3). The one or more hosts 308a through 308n can be arranged in priority such that when a host of higher priority is not available to control the UART multiplexer 302, then the host next in line of priority is selected to control the UART multiplexer 302. The order of priority can be based on: (i) a preference of BMCs controlling the UART multiplexer 302; (ii) a preference of having controllers of a same node controlling the UART multiplexer 302; (iii) a preference of minimizing physical distances between the UART multiplexer 302 and the different controllers; (iv) a customized or programmed preference based on user preference; or (v) any combination thereof.

In some implementations, the combinational logic circuit 306 always determines that from the available hosts, the host of highest priority is selected. When a higher priority host moves from unavailable to available, then that host is preferred, and the combinational logic circuit 306 switches control of the UART multiplexer to that host. That is, in order of priority, the combinational logic circuit 306 checks status of the hosts via the $Host_x$ Firmware/Status Ready signals 404a, 404b, 404c, . . . 404n. The steps of checking status of each of the hosts is indicated using reference numbers 408a, 408b, 408c, . . . 408n, respectively. If none of the hosts are ready after the combinational logic circuit 306 checks status of the nth host at 408*n*, then at step 420, each of the hosts is checked again in the order of priority starting at 408*a*.

The order of priority ensures that in all but one situation, not every Host*x* Firmware/Status Ready signals 404*a*, 404*b*, 404*c*, . . . 404*n* is checked. That is, the combinational logic circuit 306 checks the Host*x* Firmware/Status Ready signals 404*a*, 404*b*, 404*c*, . . . 404*n* in priority order to find a first one of the Host*x* Firmware/Status Ready signals 404*a*, 404*b*, 404*c*, . . . 404*n* that is asserted HIGH.

In some implementations, the combinational logic circuit 306 selects one Host*x* Select Control signal 410*a*, 410*b*, 410*c*, . . . 410*n* based on the host selected via the Host*x* Firmware/Status Ready signals 404*a*, 404*b*, 404*c*, . . . 404*n*. The selected Host*x* Select Control signal 410*a*, 410*b*, 410*c*, . . . 410*n* is used to execute control of the UART multiplexer 302 or recover control of the UART multiplexer 302. At step 412, the process 400 involves determining which option to pursue. At step 416, if a recovery process is being performed, then the priority check is performed again starting at reference number 408*a*. At step 416, if a recovery process is not being performed, then at step 418, an execute control process is performed, and the selected Host*x* Select Control signal 410*a*, 410*b*, 410*c*, . . . 410*n* is used to control the UART multiplexer 302.

Figure 5:
FIG. 5 is a flow diagram illustrating a process for managing a UART multiplexer, according to certain aspects of the present disclosure.
Figure 5:
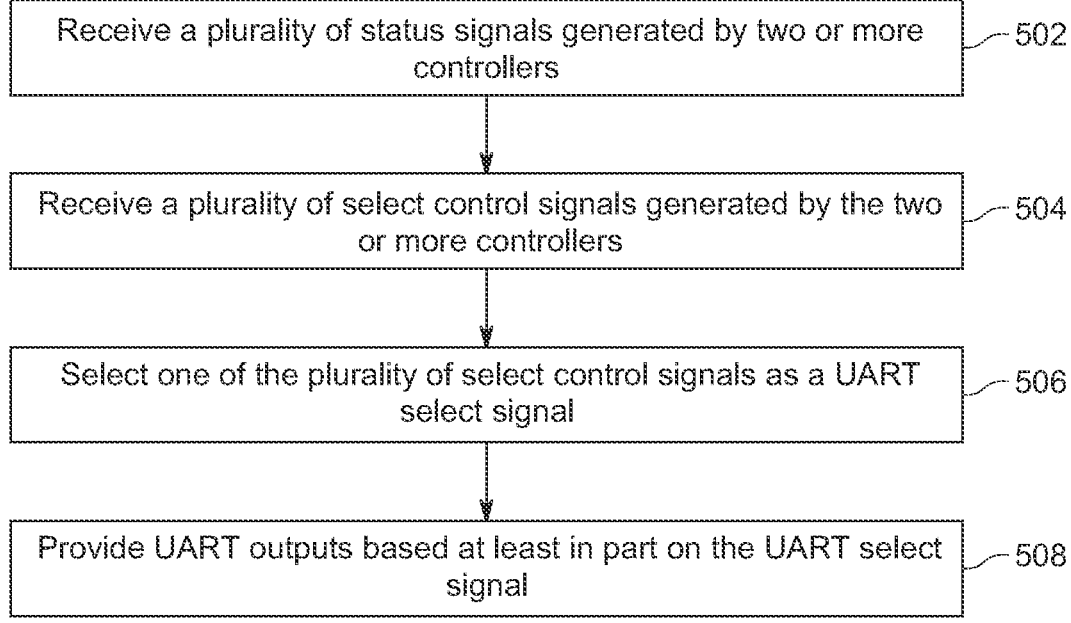

Referring to FIG. 5, a flow diagram illustrating a process 500 for managing the UART multiplexer 302 is summarized, according to certain aspects of the present disclosure. At step 502, the combinational logic circuit 306 receives a plurality of status signals (e.g., the Host*x* Firmware/Status Ready signals 404*a*, 404*b* . . . ) generated by two or more controllers (e.g., the one or more hosts 308*a*, 308*b* . . . ). Each controller generates a corresponding status signal.

At step 504, the combinational logic circuit 306 receives a plurality of select control signals (e.g., the Host*x* Select Control signal 410*a*, 410*b* . . . ) generated by the two or more controllers. Each controller generates a corresponding select control signal.

At step 506, the combinational logic circuit 306 selects one of the plurality of select control signals as a UART select signal (e.g., UART Select) for managing the UART multiplexer 302. As discussed above, the selection can be based on an assigned priority. For example, a first status signal may indicate that a first controller is available, therefore, a first select control signal generated by the first controller is used as the UART select signal. The first controller can have a higher priority than the other controllers in the two or more controllers. When the first controller is no longer available, a second controller can be selected to manage the UART multiplexer 302. The duration of control by the second controller is limited because when the first controller's status switches from unavailable to available, then the combinational logic circuit 306 designates the first controller to provide the UART select signal.

At step 508, the combinational logic circuit 306 causes the UART multiplexer 302 to provide UART outputs (e.g., UART Output0 signal and UART Output1 signal) based at least in part on the UART select signal.

Although the disclosed embodiments have been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

While various embodiments of the present disclosure have been described above, it should be understood that they have been presented by way of example only, and not limitation. Numerous changes to the disclosed embodiments can be made in accordance with the disclosure herein, without departing from the spirit or scope of the disclosure. Thus, the breadth and scope of the present disclosure should not be limited by any of the above described embodiments. Rather, the scope of the disclosure should be defined in accordance with the following claims and their equivalents.

What is claimed is:

1. A computing system comprising:
two or more controllers, a first controller of the two or more controllers configured to provide a first status signal and a first select control signal, a second controller of the two or more controllers configured to provide a second status signal and a second select control signal;
a universal asynchronous receiver-transmitter (UART) multiplexer configured to provide a UART output from at least one of a first UART input coupled to a first device or a second UART input coupled to a second device based on a UART input select signal to the UART multiplexer to select one of the first or second UART inputs; and
a combinational logic circuit configured to select one of the first controller to provide the first select control signal as the UART input select signal or the second controller to provide the second select control signal as the UART input select signal, the selection determined based at least in part on the first status signal and the second status signal.

2. The computing system of claim 1, wherein the combinational logic circuit is further configured to determine that the UART select signal is the first select control signal based at least in part on the first status signal indicating that the first controller is available.

3. The computing system of claim 1, wherein the combinational logic circuit is further configured to determine that the UART select signal is the second select control signal based at least in part on the first status signal indicating that the first controller is unavailable and the second status signal indicating that the second controller is available.

4. The computing system of claim 1, wherein the combinational logic circuit is further configured to determine a change in state of the first controller from unavailable to available, the combinational logic being further configured to determine that the UART select signal is the first select control signal.

5. The computing system of claim 1, wherein the two or more controllers include one or more baseband management controllers (BMCs), one or more storage controllers, one or more bridge integrated circuits, or any combination thereof.

6. The computing system of claim 1, further comprising a plurality of server nodes including a first server node and a second server node, wherein the first controller is a controller on the first server node and the second controller is a controller on the second server node.

7. The computing system of claim 6, wherein the first controller is a first baseband management controllers (BMC) and the second controller is a second BMC.

8. The computing system of claim 6, wherein the first BMC is provided on a first data center-ready secure control module (DC-SCM) and the second BMC is provided on a second DC-SCM.

9. The computing system of claim 6, wherein the combinational logic circuit is further configured to determine the UART select signal as one of a plurality of control signals including at least the first select control signal and the second select control signal, and wherein the UART select signal is determined based at least in part on one of a plurality of control signals including the first status signal and the second status signal.

10. The computing system of claim 6, wherein a third controller of the two or more controllers is a first storage controller on the first server node, the UART select signal being determined based on the first status signal, the second status signal, and a third status signal provided by the third controller.

11. A computing system comprising:

two or more controllers, a first controller of the two or more controllers configured to provide a first status signal and a first select control signal, a second controller of the two or more controllers configured to provide a second status signal and a second select control signal;

a universal asynchronous receiver-transmitter (UART) multiplexer configured to provide UART output from at least one of a first UART input coupled to a first device or and a second UART input coupled to a second device based on a UART input select signal; and a combinational logic circuit is configured to: determine that the two or more controllers are organized in a priority in which the first controller is of a higher priority than the second controller, wherein the priority is determined based on at least one of: (i) a preference of BMCs controlling the UART multiplexer; (ii) a preference of having controllers of a same node controlling the UART multiplexer; or (iii) a preference of minimizing physical distances between the UART multiplexer and the different controllers; and determine one of the first controller to provide the UART select signal as the first select control signal or the second controller to provide the second select control signal as the UART input select signal, the determination determined based at least in part on the priority, and the first status signal and the second status signal.

12. A computer-implemented method, comprising:

receiving, by a combinational logic circuit, a plurality of status signals generated by two or more controllers, each controller generating a corresponding status signal;

receiving, by the combinational logic circuit, a plurality of select control signals generated by the two or more controllers, each controller generating a corresponding select control signal;

selecting, by the combinational logic circuit, one of the plurality of the select control signals as a universal asynchronous receiver-transmitter (UART) select signal for controlling a UART multiplexer based at least in part on the plurality of status signals; and providing, by the UART multiplexer, a UART output from at least one of a first UART input coupled to a first device or and a second UART input coupled to a second device based at least in part on the selected UART select signal.

13. The computer-implemented method according to claim 12, further comprising determining the UART select signal as a first select control signal based at least in part on a first status signal indicating that a first controller of the two or more controllers is available.

14. The computer-implemented method according to claim 12, further comprising determining the UART select signal as a second select control signal based at least in part on (i) a second status signal of the plurality of status signals indicating that a second controller of the two or more controllers is available and (ii) a first status signal of the plurality of status signals indicating that a first controller of the two or more controllers is unavailable.

15. The computer-implemented method according to claim 14, further comprising:

determining, by the combinational logic circuit, that the first status signal indicates a change in status of the first controller from unavailable to available; and determining, by the combinational logic circuit, that the UART select signal is the first select control signal.

16. The computer-implemented method according to claim 12, wherein the two or more controllers include one or more baseband management controllers (BMCs), one or more storage controllers, one or more bridge integrated circuits, or any combination thereof.

17. The computer-implemented method according to claim 12, wherein a first controller of the two or more controllers is located on a first server node and a second controller of the two or more controllers is located on a second server node.

18. A multi-node server comprising:

a plurality of server nodes including:

a first server node having a universal asynchronous receiver-transmitter (UART) multiplexer and a first plurality of controllers, each of the first plurality of controllers configured to generate a corresponding status signal and a corresponding select signal, and a second server node having a second plurality of controllers, each of the second plurality of controllers configured to generate a corresponding status signal and a corresponding select signal; and a combinational logic circuit configured to select a UART select signal for managing the UART multiplexer from one of a plurality of select signals generated from the first or second plurality of controllers, the selection based at least in part on (i) one or more status signals generated by the first plurality of controllers, (ii) one or more status signals generated by the second plurality of controllers, or (iii) both (i) and (ii), wherein the UART multiplexer is configured to provide an UART output based at least in part on the selected UART select signal.

19. The multi-node server of claim 18, wherein the combinational logic circuit is further configured to determine the UART select signal based at least in part on assigned priority between controllers of the first plurality of controllers, the second plurality of controllers, or both.

20. The multi-node server of claim 19, wherein the first server node further includes a first baseband management controller (BMC) and the second server node further includes a second BMC, the first BMC having a higher assigned priority than the second BMC, and the combinational logic circuit further configured to determine that the UART select signal is (i) a select control signal generated by the first BMC when a status of the first BMC is available, (ii) a select control signal generated by the second BMC when the status of the first BMC is unavailable and a status of the second BMC is available.

\* \* \* \* \*